US008533517B2

(12) United States Patent
Gregie et al.

(10) Patent No.: US 8,533,517 B2
(45) Date of Patent: Sep. 10, 2013

(54) CLOCK SWITCHING CIRCUITS AND METHODS TO SELECT FROM MULTIPLE CLOCK SOURCES

(75) Inventors: Neil Gregie, Hoffman Estates, IL (US); Antonius Maria Hubertus Vos, Eindhoven (NL)

(73) Assignee: Synopsys, Inc., Mountain View, CA (US)

( * ) Notice: Subject to any disclaimer, the term of this patent is extended or adjusted under 35 U.S.C. 154(b) by 212 days.

(21) Appl. No.: 12/919,099

(22) PCT Filed: Feb. 28, 2009

(86) PCT No.: PCT/IB2009/050814
§ 371 (c)(1),
(2), (4) Date: Oct. 18, 2010

(87) PCT Pub. No.: WO2009/107108
PCT Pub. Date: Sep. 3, 2009

(65) Prior Publication Data
US 2011/0026656 A1    Feb. 3, 2011

(51) Int. Cl.
  *G06F 1/14*    (2006.01)
  *G06F 1/08*    (2006.01)
(52) U.S. Cl.
  CPC ..................................... *G06F 1/08* (2013.01)
  USPC .......................................... 713/500; 713/322
(58) Field of Classification Search
  USPC .................... 713/500–501, 300–340; 327/99
  See application file for complete search history.

(56) References Cited

U.S. PATENT DOCUMENTS

| 4,322,580 | A |   | 3/1982 | Khan et al. |
| 5,357,491 | A |   | 10/1994 | Yamasaki |
| 5,512,851 | A | * | 4/1996 | Clarke ........................ 327/144 |
| 5,604,452 | A | * | 2/1997 | Huang ........................ 327/99 |
| 5,758,132 | A | * | 5/1998 | Stråhlin ...................... 713/501 |
| 5,790,609 | A | * | 8/1998 | Swoboda ..................... 375/357 |
| 5,969,558 | A |   | 10/1999 | Abe |
| 6,411,135 | B2 | * | 6/2002 | Komoto ....................... 327/99 |
| 6,593,780 | B2 | * | 7/2003 | Lammers ..................... 327/99 |
| 7,586,337 | B2 | * | 9/2009 | Nozaki ........................ 327/99 |
| 7,626,438 | B2 | * | 12/2009 | Mari et al. ................... 327/298 |
| 2003/0145244 | A1 | * | 7/2003 | Muroor ....................... 713/500 |

(Continued)

FOREIGN PATENT DOCUMENTS
EP    1720087 A2    11/2006

OTHER PUBLICATIONS

ISA/EPO, International Search Report dated Jul. 6, 2009 for PCT/IB2009/050814.

(Continued)

*Primary Examiner* — Raymond Phan
(74) *Attorney, Agent, or Firm* — Fenwick & West LLP

(57) ABSTRACT

For use in systems having multiple potential clock sources, circuitry and methods are used for selecting from among multiple clock sources and for preventing switching to an inactive clock source. Such clock switching circuitry and methods are used to detect an activity-status indication of the clock sources, generate a selection based update-enable signal responsive to the detected activity-status indication of the selected clock source, update a clock select input signal in response to a clock switch request for switching to the selected clock source and based on the generated selection based update-enable signal, and control switching to the selected clock source based on the updated clock select input signal.

18 Claims, 4 Drawing Sheets

(56) References Cited

U.S. PATENT DOCUMENTS

Figure 1:
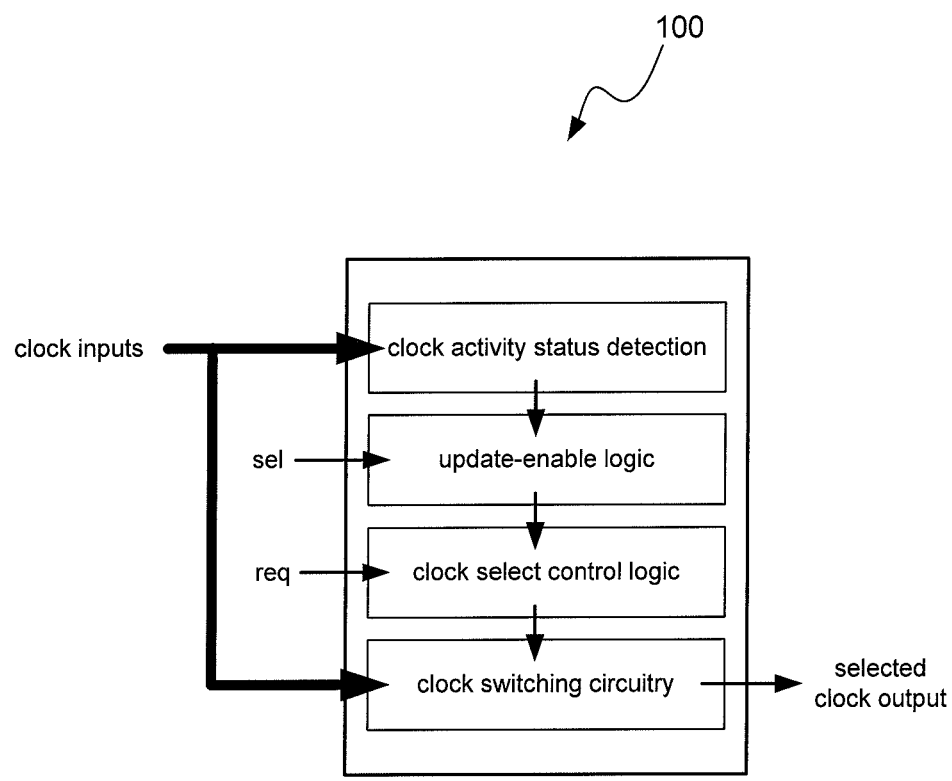

| | | | |
|---|---|---|---|
| 2005/0077926 A1* | 4/2005 | Lin et al. | 327/99 |
| 2005/0285636 A1 | 12/2005 | Ikeda | |
| 2007/0113115 A1* | 5/2007 | Hsieh | 713/500 |
| 2007/0257710 A1* | 11/2007 | Mari et al. | 327/99 |
| 2008/0054952 A1* | 3/2008 | Nozaki | 327/99 |
| 2008/0307240 A1* | 12/2008 | Dahan et al. | 713/320 |
| 2011/0145622 A1* | 6/2011 | Senohrabek et al. | 713/400 |

OTHER PUBLICATIONS

Sensory Inc., "RSC-41920 OTP Mixed Signal processor," retrieved Jun. 23, 2009 from URL:http://www.diltronic.com/pdf/sensory/rsc4192O.pdf, XP002533710.

PCT International Search Report and Written Opinion, PCT Application No. PCT/IB2009/050814, Jul. 6, 2009, 10 pages.

* cited by examiner

CLOCK SWITCHING CIRCUITS AND METHODS TO SELECT FROM MULTIPLE CLOCK SOURCES

The present invention relates generally to clock switching circuits and methods, and in particular to clock switching circuits and methods that prevent switching to inactive clock sources.

Electronic devices are ubiquitous in all facets of life, from communications to transportation, from entertainment to personal computing. As reliance on electronic devices increases, so do the demands on performance, power savings, functionality, and versatility.

Integrated circuits make up the functioning circuitry of electronic devices, including microprocessors, memory, and logic. The timing of the functions performed by integrated circuits is regulated by a clock. In early semiconductor chips, a single clock system was usually used to drive all synchronous elements on an integrated circuit chip. As integration and system complexity increased, chips included multiple clocks running at different frequencies so that different logic blocks could be clocked at rates optimal to each block. Following the addition of multiple clocks, refinements were made to allow the clocks to be changed in frequency during system operation. As such, the clock rates could be optimized either statically at a block level or dynamically to match changing user requirements. For example, changing clock rates can provide for higher system performance or lower power consumption. To be able to change clocks, clock switching circuits are used to select from among multiple different clock sources such as an internal clock source and an external clock source.

Various aspects of the present invention are directed to methods for switching to a selected one of multiple clock sources. Such methods include detecting an activity-status indication of the selected clock source, generating a selection based update-enable signal responsive to the detected activity-status indication of the selected clock source, updating a clock select input signal in response to a clock switch request for switching to the selected clock source and based on the generated selection based update-enable signal, and controlling switching to the selected clock source based on the updated clock select input signal.

Various aspects of the present invention are further directed to circuits for switching to a selected one of multiple clock sources, such circuits including detection circuitry to detect an activity-status indication of each of the clock sources, update-enable circuitry to generate a selection based update-enable signal responsive to the activity-status indication of the selected clock source, control circuitry to update a clock select input signal responsive to a clock switch request for switching to the selected clock source and based on the generated selection based update-enable signal, and switching circuitry to switch to the selected clock source based on the updated clock select input signal.

The above summary is not intended to describe each embodiment or every implementation of the present disclosure. The figures and detailed description that follow more particularly exemplify various embodiments.

Figure 2:
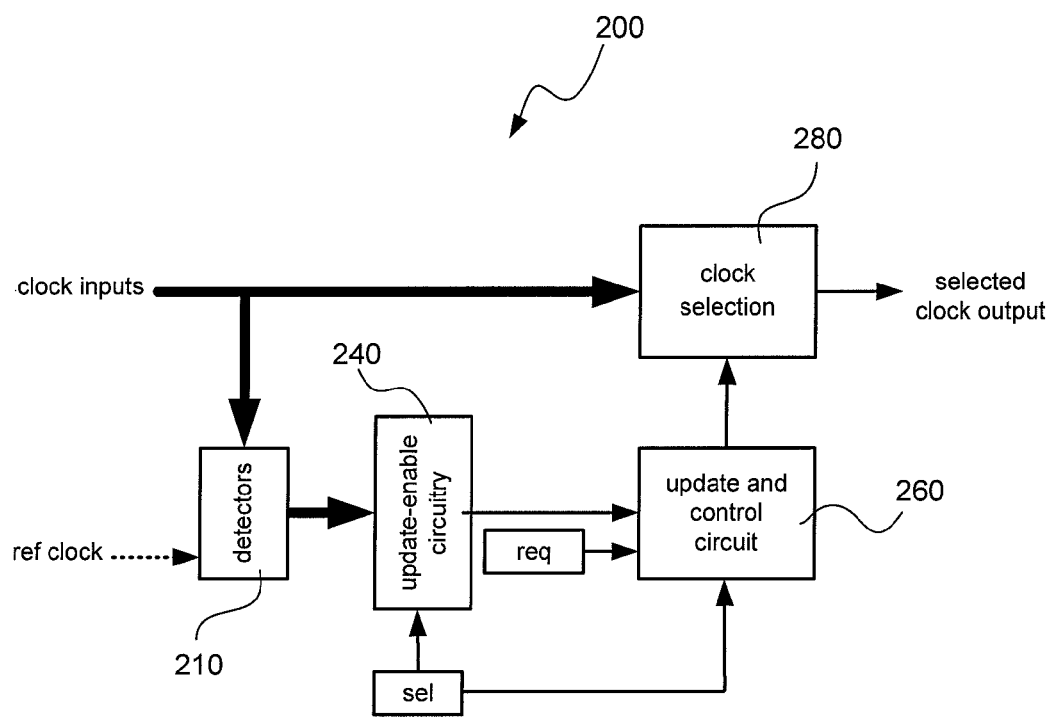
Figure 3:
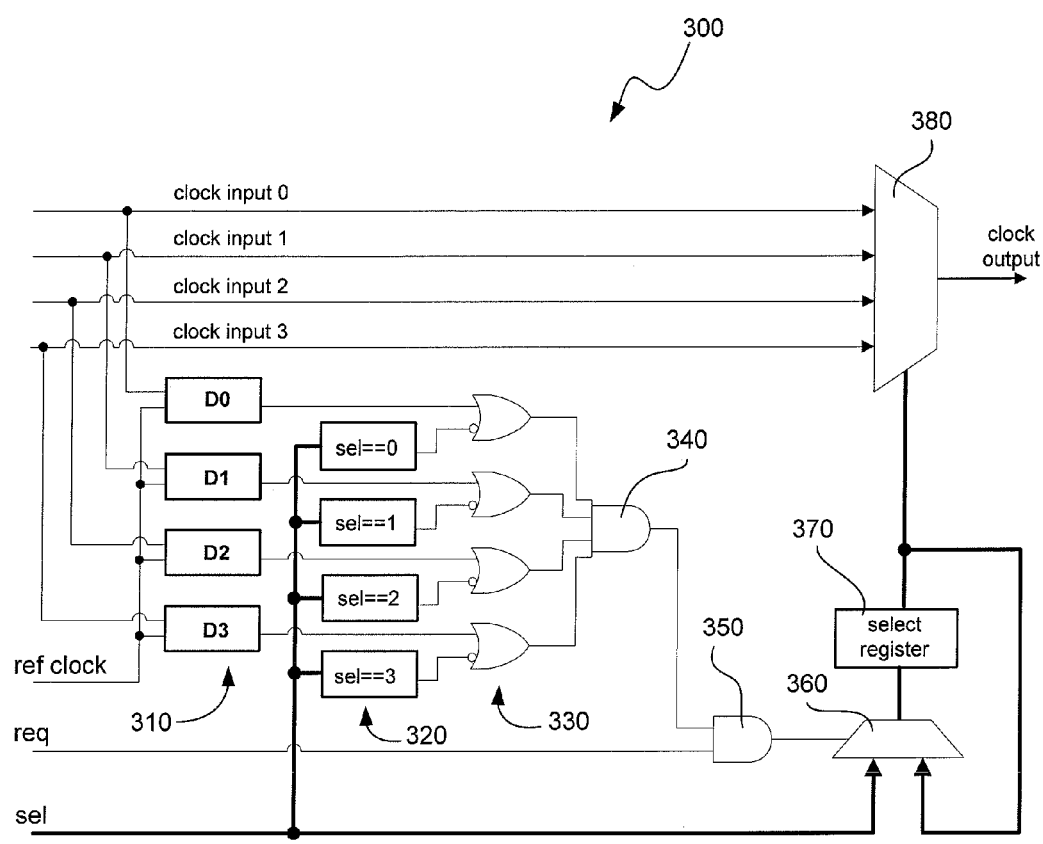
Figure 4:
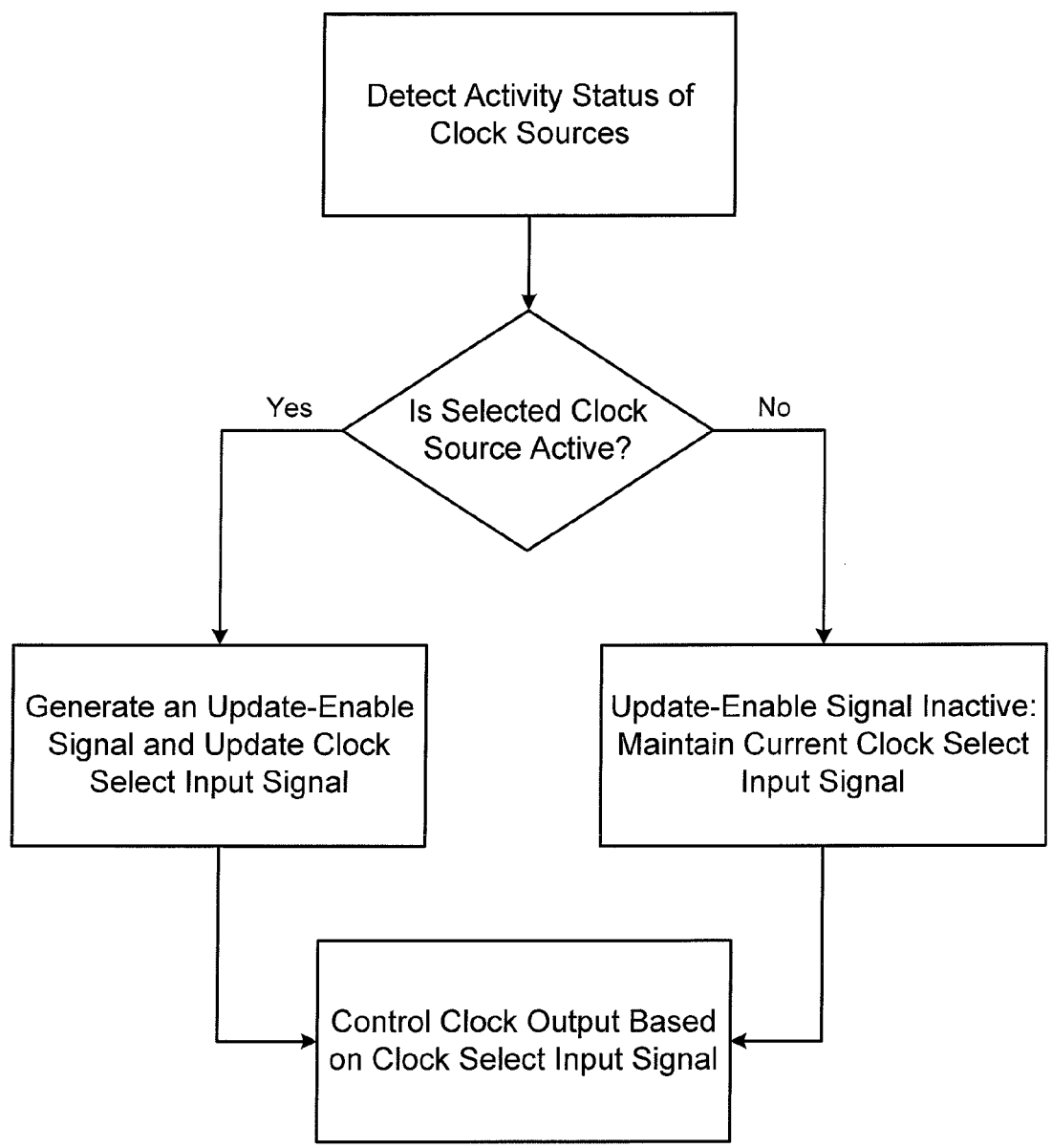

The invention may be more completely understood in consideration of the following detailed description of various embodiments of the invention in connection with the accompanying drawings, in which:

FIG. 1 schematically illustrates a high-level diagram of an example clock switching circuit in accordance with certain embodiments of the present invention;

FIG. 2 schematically illustrates a block diagram of an example clock switching circuit in accordance with certain embodiments of the present invention;

FIG. 3 illustrates a circuit diagram of an example clock switching circuit in accordance with certain embodiments of the present invention; and FIG. 4 illustrates a flow diagram of steps that can be implemented in accordance with certain embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the appended claims.

Embodiments of the present invention relate to clock switching circuits and methods that can be used to prevent switching to inactive clock sources. In certain embodiments, clock switching circuits and methods of the present invention determine an activity-status indication for multiple clock source inputs, and based on the activity-status indication of the selected clock, produce an update-enable or update-disable signal that can be used by a control circuit to allow or disallow a clock switching request. The present invention is suited for use in any applicable system that contains clock switches or in which clock switches are desired. In certain embodiments, the present invention is of particular use in systems that require a high level of reliability when operating in the field, as well as in systems that may use clock inputs from unknown sources.

Various embodiments of the present invention can be particularly useful for mitigating risks associated with potentially selecting inactive clock sources. For example, a clock source may become inactive due to a software error, failure of an external device, or instantiation of the operative integrated circuit or chip into an unexpected environment. In a case where the clock switch output is driving the processor executing software that controls the clock switch, selecting an inactive clock source can cause the system to enter a deadlock state. In certain embodiments, circuits and methods of the present invention mitigate the risk of selecting an inactive clock source by monitoring the status of clock sources so that switching requests can be overruled (i.e., selection-disabled) when the target clock source is inactive.

In certain embodiments, a clock detection mechanism can be used to monitor the status of multiple clock sources, for example external and internal clock sources. Each detector provides a signal to indicate if its associated clock is active or inactive. This information can then be used to overrule switching requests if the request would result in an inactive clock being selected by the clock switch. As such, flexibility benefits due to dynamic clock switching can be maintained while mitigating clock switching risks.

FIG. 1 illustrates a functional diagram of exemplary clock selection circuit 100 in accordance with an embodiment of the present invention. The clock selection circuit 100 selects which of a plurality of clock sources to produce as the clock source output. The multiple clock sources may be internal clocks, external clocks, clocks having different frequencies, clocks having different phases, or combinations of these. The inputs into the clock selection circuit 100 include the multiple clock inputs, a selected clock input signal (sel), and a clock switching request (req). In accordance with certain embodiments, the clock inputs are fed into circuitry for detecting an activity-status indication of at least the selected clock source. Update-enable logic, which is responsive to the activity-status detection circuitry and the selected clock input signal (sel), determines whether to allow or disallow clock switching based on the activity-status indication of the selected clock source. Control logic, which is responsive to the update-enable logic and the clock switching request (req), produces a control signal for the clock switching circuitry. The clock switching circuitry uses the control signal to determine which of the clock inputs to output.

FIG. 2 illustrates a block diagram of an exemplary clock selection circuit 200 in accordance with an embodiment of the present invention. Thicker arrows between functional blocks generally represent multiple signals. The clock selection circuit 200 includes a clock selection circuit 280 that selects from multiple clock inputs based on a control signal produced by an update and control circuit 260. The update and control circuit 260 produces a control signal in response to a clock switching request (req) and an enable/disable signal produced by update-enable circuitry 240. The control signal produced by the update and control circuit 260 derives from the selected clock input signal (sel) when the selected clock is active as determined by receiving an update-enable signal from the selection-enable circuitry 240. Update-enable circuitry 240 produces the enable/disable signal in response to detectors 210, which produce an activity-status indication for each of the clock sources. The detectors 210 may be optionally operated by a reference clock (ref clock) that need not bear any particular relationship to the input clocks. When the detectors 210 provide an active status indication for the selected clock source, the update-enable circuitry 240 produces an active update-enable signal. When the detectors 210 provide an inactive status indication for the selected clock source, the selection-enable circuitry 240 produces an inactive update-enable signal.

FIG. 3 illustrates an example of a clock selection circuit 300 in accordance with an embodiment of the present invention. A multiplexer 380 selects from among multiple clock source inputs such as the four clock inputs shown (clock input 0 through clock input 3) and outputs the selected clock source. The multiplexer 380 selects from among the clock source inputs based on the value stored in a select register 370. Writing to the select register 370 is controlled by a multiplexer 360, which selects between writing data from the selected clock input signal (sel) or maintaining the current value of the select register 370. Multiplexer 360 writes data from the selected clock input signal (sel) when the AND gate 350 produces a logical 1, and otherwise maintains the current value of the select register 370 as indicated by the select register output being tied back to the multiplexer. The AND gate 350 has two inputs, namely a clock switch request (req) and the output of AND gate 340, which produces a logical 1 only when the selected clock source is active. As such, when the selected clock source is active and a request to switch to the selected clock source is received, AND gate 350 signals for multiplexer 360 to write data from the selected clock input signal (sel) to the select register, which in turn signals the multiplexer 380 to switch to the selected clock input. When the selected clock source is inactive, AND gate 350 produces a logical 0 regardless of the clock switch request state, thereby preventing re-writing of the select register 370 and maintaining the current clock source.

The AND gate 340 produces the output for the update-enable circuitry that determines whether the selected clock source is active. Each of the clock source inputs (clock input 0 through clock input 3) is fed into an associated detector (D0 through D3) of a block of detectors 310. The detectors can be operated using a reference clock (ref clock). The output of each detector is a logical 1 when the associated clock source is active and a logical 0 when the associated clock source is inactive. Exemplary detectors function using a signal 'toggle' that alternates between 0 and 1, where 'toggle' is sent through a register clocked by a reference clock. The output of this register is checked after waiting for a period determined by the reference clock. If the output has not changed to match the input value by the time of the check, the detected clock is flagged as absent (inactive), and otherwise the clock is flagged as present (active).

A block of comparators 320 compares the selected clock input value (sel) with static values associated with each clock input source. As such, all the comparators 320 will produce a logical 0 except for the comparator whose static value matches the selected clock input value (sel), which produces a logical 1. Logic gates 330 perform an OR function on the outputs of the detectors 310 and the inverted outputs of the corresponding comparators 320. Thus, each of the logic gates 330 will produce a logical 1 if the associated clock source does not match the selected clock source, and will produce a logical 1 if the associated clock source matches the selected clock source only under the condition that the selected clock source is active. The AND gate 340 produces a logical 1 (update enabled) when all the outputs of the logic gates 330 are 1, which occurs only when the selected clock source is active.

In cases where the selected clock source is detected as inactive, and therefore in which the clock switching request is prevented (or disallowed), it may be useful to provide a signal back to the system processor that an intended clock switch did not happen, for example through an interrupt or other event.

By way of summary, FIG. 4 illustrates steps performed in exemplary embodiments of the present invention. The activity status of the clock sources is detected. If the selected clock source is active, then an update-enable signal is generated that is used to update the clock select input signal to reflect the selected clock source. If the selected clock source is inactive, the update-enable signal stays inactive which prevents the clock select input signal from being updated, thereby maintaining its current value. As such, when a clock switching request is received, the clock select input signal that is used to control the clock source output will only call for switching to the selected clock source when the selected clock source is active.

In addition to the above, the various processing approaches described herein can be implemented using a variety of devices and methods including general purpose processors implementing specialized software, digital signal processors, programmable logic arrays, discrete logic components and fully-programmable and semi-programmable circuits such as PLAs (programmable logic arrays). For example, the above algorithms are executed on a microcomputer (a.k.a. microprocessor) in connection with certain embodiments, and as may be implemented as part of one or more of the devices shown in the figures.

While the present invention has been described above and in the claims that follow, those skilled in the art will recognize that many changes may be made thereto without departing from the spirit and scope of the present invention.

What is claimed is:

1. A method for switching between a plurality of clock sources comprising:
   receiving a select signal indicating selection of a clock source among the plurality of clock sources;
   detecting an activity-status indication representing that the selected clock source is active or inactive;

generating an enable signal for the selected clock source responsive to receiving the select signal and detecting that the selected clock source is active;

in response to receiving a clock switch request instructing switching to the selected clock source and receiving the enable signal, updating a clock select input signal to indicate switching to the selected clock source; and switching to the selected clock source in response to receiving the updated clock select input signal.

2. The method of claim 1, further comprising detecting that clock sources other than the selected clock source are active or inactive.

3. The method of claim 1, wherein generating the enable signal includes generating a selection-enable signal when the selected clock source is indicated as active, and generating a selection-disable signal when the selected clock source is indicated as inactive.

4. The method of claim 1, wherein switching to the selected clock source includes using the clock select input signal as a control input of a multiplexer that selects from among the plurality of clock sources.

5. The method of claim 1, wherein the plurality of clock sources include at least one internal clock source and at least one external clock source.

6. The method of claim 1, wherein the plurality of clock sources include clock sources having different phases.

7. The method of claim 1, further comprising receiving a switching-status signal indicating whether the clock switch request was allowed or prevented responsive to determining whether to switch to the selected clock source.

8. The method of claim 1, wherein the plurality of clock sources include clock sources having different frequencies.

9. The method of claim 3, further comprising storing a clock value representative of the clock select input signal in a select register, and wherein updating the clock select input signal comprises overwriting the clock value in the select register to identify the selected clock source in response to generating the enable signal for the selected clock.

10. The method of claim 3, further comprising storing a clock value representative of the clock select input signal in a select register, and wherein updating the clock select input signal comprises preventing overwriting of the clock value in the select register in response to not generating the enable signal.

11. A circuit for switching between a plurality of clock sources comprising:

detection circuitry configured to detect an activity-status indication representing that a selected clock source is active or inactive;

update-enable circuitry configured to:
  receive a select signal indicating selection of the selected clock source; and
  generate an enable signal for the selected clock source responsive to receiving the select signal and detecting that the selected clock source is active;

control circuitry configured to update a clock select input signal to indicate switching to the selected clock source responsive to receiving a clock switch request instructing switching to the selected clock source and receiving the enable signal; and switching circuitry configured to switch to the selected clock source in response to receiving the updated clock select input signal.

12. The circuit of claim 11, wherein the detection circuitry further comprises a plurality of detectors, each detector associated with one of the multiple clock sources and configured to produce a logical 1 if the associated clock source is active and a logical 0 if the associated clock source is inactive.

13. The circuit of claim 11, wherein the update-enable circuitry further comprises a plurality of comparators configured to compare the clock select input signal with static values associated with the plurality of clock sources.

14. The circuit of claim 11, wherein the control circuitry further comprises a multiplexer configured to select between overwriting a clock value in a select register to reflect the selected clock source and maintaining the clock value in the select register to reflect a current clock source, the value in the select register representing the updated clock select input signal.

15. The circuit of claim 11, wherein the switching circuitry includes a multiplexer configured to select an output clock source from among the plurality of clock sources in response to receiving the updated clock select input signal.

16. The circuit of claim 11, wherein the plurality of clock sources include at least one internal clock source and at least one external clock source.

17. The circuit of claim 11, wherein the plurality of clock sources include clock sources having different phases.

18. The circuit of claim 11, wherein the plurality of clock sources include clock sources having different frequencies.

* * * * *